Feb. 23, 1926.  
P. J. ANDERSEN  
1,574,227  
GLARE SCREEN  
Filed May 11, 1925
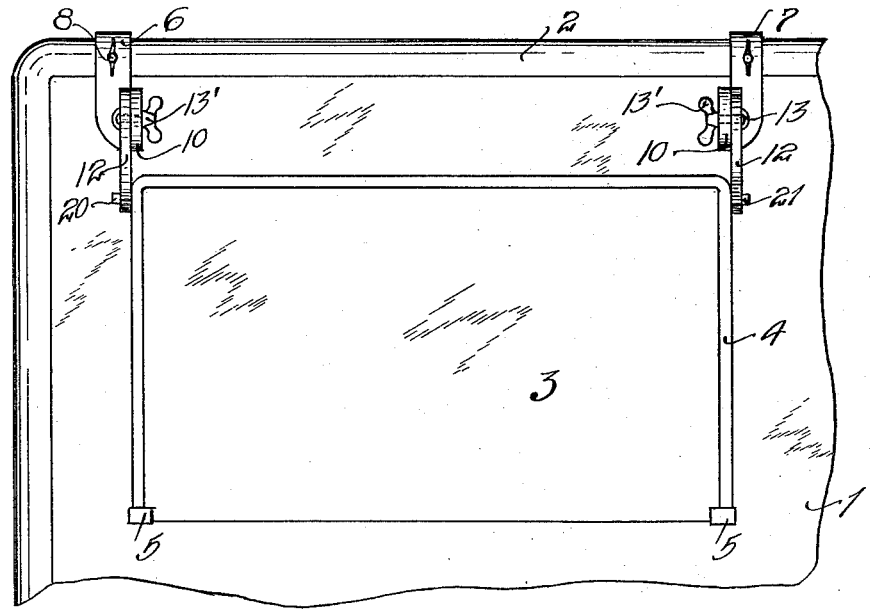
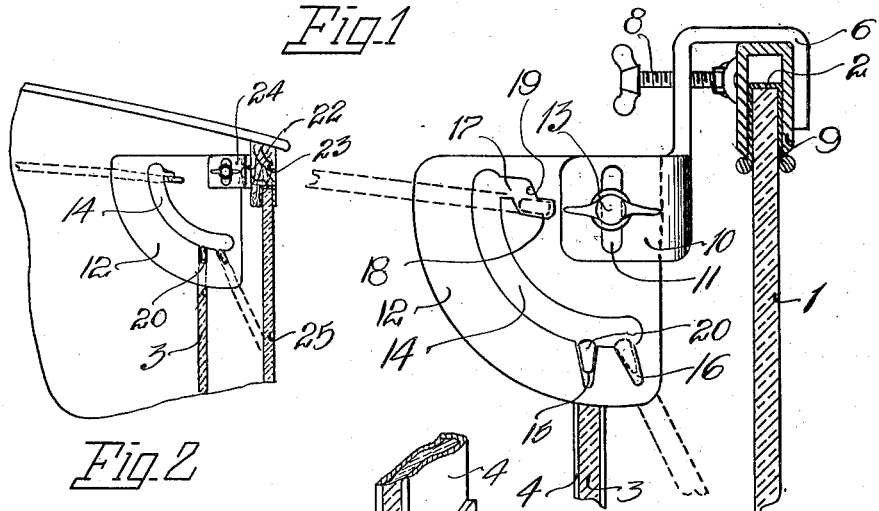
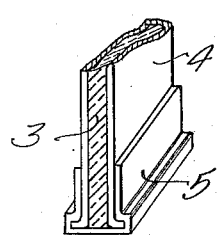
Inventor  
Peter J. Andersen  
By Herbert E. Smith  
Attorney Patented Feb. 23, 1926.

1,574,227

UNITED STATES PATENT OFFICE.

PETER J. ANDERSEN, OF SPOKANE, WASHINGTON.

GLARE SCREEN.

Application filed May 11, 1925. Serial No. 29,383.

*To all whom it may concern:*

Be it known that I, PETER J. ANDERSEN, a citizen of the United States, residing at Spokane, in Spokane County and State of Washington, having invented certain new and useful Improvements in Glare Screens, of which the following is a specification.

My present invention relates to improvements in glare screens of the type used in combination with the windshield of an automotive vehicle for protecting the driver of the vehicle from the glare of lights of approaching vehicles at night, and from dazzling rays of the sun by day.

The invention contemplates the use of an attachment applicable for use with substantially all automobiles or automotive vehicles now in use, and involves a panel of semi-transparent material, such as a colored glass plate or screen of similar nature. Means are provided whereby the device may be attached with equal facility to either an open car or a closed car and the screen may be placed in parallel relation to either a vertically arranged windshield or an inclined windshield, and means are provided for moving the screen to inoperative position when not desired for use.

The invention consists in certain novel combinations and arrangements of parts for carrying out my invention as hereinafter set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in elevation showing a glare screen or panel in operative position at the rear side of an open-car windshield.

Figure 2 is a detail longitudinal sectional view showing a portion of a closed car with a portion of the glare screen shown in full lines for use, and two selected positions in dotted lines, one with the screen out of the way near the roof of the car and the other adapting the screen for use with an inclined windshield.

Figure 3 is an enlarged sectional detail view of the device as shown in Figure 1.

Figure 4 is a detail sectional view showing the binding or bead on the edge of the glare screen or glass panel.

In carrying out my invention in its preferred form as illustrated in the drawings the device is adapted to be attached with facility to either an open car or a closed car, and is preferably located at the rear of the windshield or within the closed car. When not in use the glare screen is carried just under the roof of the closed car or beneath the top of the open car, and is out of the way, but readily accessible for use when needed.

In order that the general arrangement and relative positions of parts may readily be understood I have indicated in the drawings of Figures 1 and 3 a usual type of windshield as 1 having a reinforcing edge bead or bar 2 across its top, which parts are used in applying my device for the performance of its functions.

As illustrated in the drawings the glare screen 3 is a glass panel preferably of rectangular shape and colored as desired to suit different conditions, but semi-transparent in nature for a protection to the eyes of the driver who will direct his vision through the screen or glass panel and the windshield when the screen is in use.

Preferably the screen is provided with a reinforcing bead 4 of U-shape extending around three of its sides, and at two of its corners retaining clips 5 are fixed to complete the frame or reinforcing strips of the screen.

In fastening the screen to the windshield of an open car two attaching hooks 6 and 7 are employed, and a clamping bolt or screw 8 is used with each of these U-shaped hooks to clamp them to the windshield by means of U-shaped clips 9 that are first engaged over the frame bar 2 of the panel. The hooks are of a size to readily adapt them to different thicknesses of bars 2 and the clamp bolts readily adjust themselves to the different thicknesses of these bars.

Each fastening or attaching hook is provided with an integral bracket plate 10 disposed in a plane at right angles to the plane of the hook and also disposed longitudinally in vertical position of the car. Each bracket plate 10 is fashioned with a vertically extending slot 11, and a triangular shaped supporting plate 12 is used with each bracket plate, a set bolt 13 being carried by the supporting plate and passed through the slot of the bracket plate for clamping these plates together. Through the use of the slot, the screen 3 may be vertically adjusted within the limits of the length of the slots 11 of the bracket plates to adapt the screen for various conditions, and a nut 13' on the bolt clamps the supporting plate against the bracket plate. The vertical edge of the triangular shaped supporting plate rests against and is guided by contact with the back wall of the hook and the supporting plate thus forms a rigid and stable support for the screen 3 which is adjustable to various positions with relation to the fixed supporting plates between which it is suspended.

The supporting plates are each provided with an arcuate slot as 14 extending through a space of more than ninety degrees and preferably located near the edge of the plate. As best seen in Figure 3 this slot is fashioned with two notches 15 and 16 at its lower end and both of V-shape. The notches are fashioned in suitable manner in the outer edge of the slot, the notch 15 being in a vertical plane for use when the screen 3 is carried parallel with the vertical windshield 1, and the notch 16, which is disposed at an angle to the vertical being adapted for use with the screen when the latter is arranged parallel with an inclined windshield, as indicated by dotted lines.

At the upper end of the slot 14 each supporting plate is fashioned with a notch 17 and an offset, second notch 18, and these offset notches are joined by an open space having inclined parallel walls 19, the offset notch 18 having its walls in an approximately horizontal position or slightly inclined as indicated in Figure 3.

For co-action with the arcuate slot and the several notches in the supporting plates a pair of opposed trunnions 20 and 21 are arranged at opposite corners of the screen and project outwardly therefrom. These trunnions are of V-shape in cross section and are adapted to fit snugly in either of the notches 15 and 16 to suspend the screen in operative position back of the windshield as shown. By the formation of the V-shaped notches and the wedge shaped trunnions it will be apparent that the screen may be suspended and rigidly held against swinging on its trunnions, and of course the two supporting plates at the ends of the screen prevent longitudinal movement of the screen.

When not desired for use the screen is first lifted slightly to disengage the trunnions from the notches as 15 and then the screen is swung bodily backward and upward, to cause the trunnions to travel or ride through the arcuate slots 14 of the supporting plates until the screen reaches or slightly passes the horizontal position. The screen is then shoved forward causing the trunnions to pass from the slots 14 through the notches 17, and then by swinging the screen slightly on the trunnions as a center the latter are shoved through the inclined connecting slots 19 and into the notches 18 of the supporting plates. When properly seated in these last mentioned notches the walls of the notches hold the trunnions with the screen in approximately horizontal or a slightly inclined position near the top of the car, and the screen is thus rigidly suspended out of the way. When desired for use the screen is grasped by both hands, slightly elevated or swung upwardly in order that the trunnions may be disengaged from the notches 18 and then withdrawn through slots 19 and 17 into the arcuate slots 14. Then by a continuous swinging motion the screen may be lowered to operative position as indicated in Figure 3.

In adapting the screen for use with a closed type of car the fastening hooks 6 and 7 are dispensed with, and angle plates 22 are substituted. These angle plates are secured at the inner side of the head casing 23 of the closed car and are each fashioned with a bracket plate 24 having a slot 11 similar to the bracket plates of the fastening hooks 6 and 7, and the screen is used in combination with the glass panel or windshield 25 of the closed car.

The screen for the closed car is manipulated in the same manner as that of the open car, and in both instances it will be apparent that this manipulation may be accomplished with facility and convenience. The device may be used as a permanent attachment for the car of either type, or when not desired it may with facility be withdrawn from use.

Having thus fully described my invention, what I claim as new and desire to secure by Letters Patent is:—

1. The combination with attaching means of a pair of slotted bracket plates and a complementary pair of supporting plates and clamping means therefor, of a glare screen having a pair of opposed trunnions, said supporting plates having complementary slots therein and complementary notches in the walls of said slots for the reception of said trunnions.

2. In an attachment as described, the combination with a supporting plate having an arcuate slot and a pair of spaced V-shaped notches at the lower end of said slot, said arcuate slot having an angular slot and an offset notch at the upper end thereof, and a glare screen having a trunnion adapted to co-act with said slotted and notched plate.

3. In an attachment as described the combination with a pair of bracket plates and a pair of adjustable supporting plates, of a glare screen having a pair of wedge shaped trunnions said supporting plates having arcuate slots therein, spaced V-shaped notches at the lower ends of said slots, and angular notches and offset slots at the upper ends of said arcuate slots.

In testimony whereof I affix my signature.

PETER J. ANDERSEN.